US009357376B2

(12) United States Patent
Piercy (10) Patent No.: US 9,357,376 B2
(45) Date of Patent: May 31, 2016

(54) NETWORK ELEMENTS, WIRELESS COMMUNICATION SYSTEM AND METHODS THEREFOR

(71) Applicant: ip.access Limited, Cambridshire (GB)

(72) Inventor: Neil Philip Piercy, Herts (GB)

(73) Assignee: ip.access Limited, Cambourne, Cambridgeshire (GB)

( * ) Notice: Subject to any disclaimer, the term of this patent is extended or adjusted under 35 U.S.C. 154(b) by 23 days.

(21) Appl. No.: 14/321,250

(22) Filed: Jul. 1, 2014

(65) Prior Publication Data

US 2015/0036589 A1  Feb. 5, 2015

(30) Foreign Application Priority Data

Jul. 31, 2013 (GB) .................................. 1313701.3

(51) Int. Cl.
*H04W 76/06* (2009.01)
*H04W 8/18* (2009.01)
*H04W 12/08* (2009.01)
*H04W 48/08* (2009.01)
*H04W 8/20* (2009.01)

(52) U.S. Cl.
CPC ......... *H04W 8/18* (2013.01); *H04W 8/20* (2013.01); *H04W 12/08* (2013.01); *H04W 48/08* (2013.01)

(58) Field of Classification Search
CPC ......... H04W 8/18; H04W 8/20; H04W 48/08; H04W 12/08
See application file for complete search history.

(56) References Cited

U.S. PATENT DOCUMENTS

| 3,906,348 A | 9/1975 | Willmott |
| 4,097,859 A | 6/1978 | Looschen |
| 4,178,549 A | 12/1979 | Ledenbach |
| 4,243,976 A | 1/1981 | Warner |
| 4,255,742 A | 3/1981 | Gable |
| 4,387,455 A | 6/1983 | Schwartz |
| 4,387,460 A | 6/1983 | Boutmy |
| 4,468,787 A | 8/1984 | Keiper |
| 4,566,044 A | 1/1986 | Langdon |
| 4,677,284 A | 6/1987 | Genest |

(Continued)

FOREIGN PATENT DOCUMENTS

| EP | 1223700 | 7/2002 |
| EP | 1313260 | 5/2003 |

(Continued)

OTHER PUBLICATIONS

Australian Examiners First Report on Patent Application No. 2006202850 Dated Feb. 25, 2010.

(Continued)

*Primary Examiner* — Jay P Patel
(74) *Attorney, Agent, or Firm* — Fitch, Even, Tabin & Flannery LLP (57) ABSTRACT

A radio access network element (101) obtains a permanent subscriber identity (IMSI) of a User Equipment (103) in an LTE wireless communication system (100) by sending a "fake" service reject message to a User Equipment which has attempted to attach to a cell (102) in a request for services message which includes its S-TMSI. The reject message may include a cause code which results in the UE attempting to attach again, this time using its IMSI. The fake service reject message may be generated in a an eNode B serving one or more macrocells or a evolved Home Node B serving a small cell.

14 Claims, 3 Drawing Sheets

(56) References Cited

U.S. PATENT DOCUMENTS

| | | | |
|---|---|---|---|
| 4,750,118 A | 6/1988 | Heitschel |
| 4,808,995 A | 2/1989 | Clark |
| 4,829,296 A | 5/1989 | Clark |
| 4,893,338 A | 1/1990 | Pastor |
| 4,910,750 A | 3/1990 | Fisher |
| 4,988,992 A | 1/1991 | Heitschel |
| 5,021,776 A | 6/1991 | Anderson |
| 5,136,548 A | 8/1992 | Claar |
| 5,150,464 A | 9/1992 | Sidhu |
| 5,197,061 A | 3/1993 | Halbert-Lassalle |
| 5,252,960 A | 10/1993 | Duhame |
| 5,420,925 A | 5/1995 | Michaels |
| 5,442,340 A | 8/1995 | Dykema |
| 5,517,187 A | 5/1996 | Bruwer |
| 5,565,812 A | 10/1996 | Soenen |
| 5,576,701 A | 11/1996 | Heitschel |
| 5,578,999 A | 11/1996 | Matsuzawa |
| 5,600,653 A | 2/1997 | Chitre |
| 5,635,913 A | 6/1997 | Willmott |
| 5,673,017 A | 9/1997 | Dery |
| 5,686,904 A | 11/1997 | Bruwer |
| 5,699,065 A | 12/1997 | Murray |
| 5,774,065 A | 6/1998 | Mabuchi |
| 5,838,747 A | 11/1998 | Matsumoto |
| 5,942,985 A | 8/1999 | Chin |
| 5,949,349 A | 9/1999 | Farris |
| 6,012,144 A | 1/2000 | Pickett |
| 6,049,289 A | 4/2000 | Waggamon |
| 6,052,408 A | 4/2000 | Trompower |
| 6,070,154 A | 5/2000 | Tavor |
| 6,154,544 A | 11/2000 | Farris |
| 6,157,719 A | 12/2000 | Wasilewski |
| 6,175,312 B1 | 1/2001 | Bruwer |
| 6,181,255 B1 | 1/2001 | Crimmins |
| 6,414,587 B1 | 7/2002 | Fitzgibbon |
| 6,456,726 B1 | 9/2002 | Yu |
| 6,496,477 B1 | 12/2002 | Perkins |
| 6,535,544 B1 | 3/2003 | Partyka |
| 6,688,518 B1 | 2/2004 | Valencia |
| 6,690,796 B1 | 2/2004 | Farris |
| 6,697,379 B1 | 2/2004 | Jacquet |
| 6,754,266 B2 | 6/2004 | Bahl |
| 6,810,123 B2 | 10/2004 | Farris |
| 6,829,357 B1 | 12/2004 | Alrabady |
| 6,850,910 B1 | 2/2005 | Yu |
| 6,930,983 B2 | 8/2005 | Perkins |
| 6,963,561 B1 | 11/2005 | Lahat |
| 6,980,518 B1 | 12/2005 | Sun |
| 6,980,655 B2 | 12/2005 | Farris |
| 6,998,977 B2 | 2/2006 | Gregori |
| 7,002,490 B2 | 2/2006 | Lablans |
| 7,039,809 B1 | 5/2006 | Wankmueller |
| 7,042,363 B2 | 5/2006 | Katrak |
| 7,050,479 B1 | 5/2006 | Kim |
| 7,071,850 B1 | 7/2006 | Fitzgibbon |
| 7,139,398 B2 | 11/2006 | Candelore |
| 7,301,900 B1 | 11/2007 | Laksono |
| 7,333,615 B1 | 2/2008 | Jarboe |
| 7,336,787 B2 | 2/2008 | Unger |
| 7,346,163 B2 | 3/2008 | Pedlow |
| 7,353,499 B2 | 4/2008 | De Jong |
| 7,412,056 B2 | 8/2008 | Farris |
| 7,415,618 B2 | 8/2008 | De Jong |
| 7,429,898 B2 | 9/2008 | Akiyama |
| 7,492,905 B2 | 2/2009 | Fitzgibbon |
| 7,535,926 B1 | 5/2009 | Deshpande |
| 7,561,075 B2 | 7/2009 | Fitzgibbon |
| 7,623,663 B2 | 11/2009 | Farris |
| 7,668,125 B2 | 2/2010 | Kadous |
| 7,757,021 B2 | 7/2010 | Wenzel |
| 7,786,843 B2 | 8/2010 | Witkowski |
| 8,194,856 B2 | 6/2012 | Farris |
| 8,233,625 B2 | 7/2012 | Farris |
| 2001/0023483 A1 | 9/2001 | Kiyomoto |
| 2002/0034303 A1 | 3/2002 | Farris |
| 2002/0184504 A1 | 12/2002 | Hughes |
| 2002/0191785 A1 | 12/2002 | McBrearty |
| 2002/0191794 A1 | 12/2002 | Farris |
| 2003/0056001 A1 | 3/2003 | Mate |
| 2003/0070092 A1 | 4/2003 | Hawkes |
| 2003/0072445 A1 | 4/2003 | Kuhlman |
| 2003/0147536 A1 | 8/2003 | Andivahis |
| 2003/0177237 A1 | 9/2003 | Stebbings |
| 2004/0019783 A1 | 1/2004 | Hawkes |
| 2004/0081075 A1 | 4/2004 | Tsukakoshi |
| 2004/0174856 A1 | 9/2004 | Brouet |
| 2004/0181569 A1 | 9/2004 | Attar |
| 2005/0053022 A1 | 3/2005 | Zettwoch |
| 2005/0058153 A1 | 3/2005 | Santhoff |
| 2006/0109978 A1 | 5/2006 | Farris |
| 2006/0176171 A1 | 8/2006 | Fitzgibbon |
| 2007/0005806 A1 | 1/2007 | Fitzgibbon |
| 2007/0006319 A1 | 1/2007 | Fitzgibbon |
| 2007/0018861 A1 | 1/2007 | Fitzgibbon |
| 2007/0058811 A1 | 3/2007 | Fitzgibbon |
| 2008/0229400 A1 | 9/2008 | Burke |
| 2008/0297370 A1 | 12/2008 | Farris |
| 2008/0311923 A1* | 12/2008 | Petrovic ............. H04W 76/021 455/450 |
| 2009/0016530 A1 | 1/2009 | Farris |
| 2009/0021348 A1 | 1/2009 | Farris |
| 2009/0088161 A1* | 4/2009 | Narasimha ............. H04W 8/26 455/436 |
| 2009/0262682 A1 | 10/2009 | Khetawat et al. |
| 2010/0226314 A1* | 9/2010 | Xu ...................... H04L 65/1016 370/328 |
| 2010/0297979 A1* | 11/2010 | Watfa .................... H04W 8/205 455/404.1 |
| 2011/0092207 A1* | 4/2011 | Motohashi ........... H04W 48/02 455/435.1 |
| 2011/0274034 A1* | 11/2011 | Rautiola ............. H04L 65/1073 370/328 |
| 2011/0316668 A1 | 12/2011 | Laird |
| 2011/0317835 A1 | 12/2011 | Laird |
| 2012/0302170 A1* | 11/2012 | Frazier ................. H04W 84/20 455/41.3 |
| 2013/0170639 A1 | 7/2013 | Fitzgibbon |
| 2013/0308527 A1* | 11/2013 | Chin .................... H04W 76/06 370/328 |
| 2014/0146759 A1* | 5/2014 | Cho ..................... H04L 5/0096 370/329 |
| 2014/0313889 A1* | 10/2014 | Jeong ................. H04W 76/028 370/230 |

FOREIGN PATENT DOCUMENTS

| | | | |
|---|---|---|---|
| EP | 1760985 A2 | 3/2007 | |
| FR | 2737373 | 1/1997 | |
| GB | 2288261 | 10/1995 | |
| GB | 2430115 | 3/2007 | |
| GB | 2440816 | 2/2008 | |
| JP | 09322274 | 12/1997 | |
| WO | 0010301 | 2/2000 | |
| WO | 0010302 | 2/2000 | |
| WO | WO2012137978 A1 | 10/2012 | |
| WO | WO 2013/051845 A2 * | 4/2013 | ............ H04W 76/04 |

OTHER PUBLICATIONS

British Application No. GB1110709.1; Combined Search and Examination Report Under Sections 17 and 18(3); Dated: Sep. 29, 2011.
British Combined Search and Examination Report Under Sections 17 and 18(3); British Patent Application No. GB0920612.9; Date of Search: Dec. 16, 2009.
British Combined Search and Examination Report Under Sections 17 and 18(3); British Patent Application No. GB1000541.1; Dated: Jan. 28, 2010.
British Combined Search and Examination Report Under Sections 17 and 18(3); British Patent Application No. GB1104752.9; Dated: Apr. 11, 2011.
British Examination Report Under Section 17(5); British Application No. GB0715089.9 Dated Nov. 28, 2007.

(56) References Cited

OTHER PUBLICATIONS

British Examination Report Under Section 18(3); British Patent Application No. GB0601795.8; Dated: Apr. 22, 2009.
British Examination Report Under Section 18(3); British Patent Application No. GB0613068.6; Dated: May 6, 2010.
British Examination Report Under Section 18(3); British Patent Application No. GB0613068.6; Dated Nov. 26, 2010.
British Patent Application No. GB1110710.9; Combined Search and Examination Report Under Sections 17 and 18(3); Date of Search: Sep. 30, 2011.
British Search Report Under Section 17(5); British Patent Application No. GB0613068.6; Date of Search: Oct. 12, 2006.
British Search Report Under Section 17; British Patent Application No. GB0601795.8; Date of Search: May 22, 2006.
British Search Report Under Section 17; British Patent Application No. GB0613068.6; Date of Search: Aug. 23, 2006.
British Search Report Under Section 17; British Patent Application No. GB0715089.9; Date of Search: May 8, 2008.
British Search Report Under Section 18(3); British Patent Application No. GB0613068.6; Dated: Jan. 28, 2010.
Canadian Patent Application No. 2,551,295; Office Action Dated May 6, 2013.
Examination Report Under Section 17 From British Patent Application No. GB0601795.8; Date of Search: Jan. 28, 2010.
Examination Report Under Section 17 From British Patent Application No. GB0601795.8; Date of Search: Sep. 25, 2009.
Examination Report Under Section 17 From British Patent Application No. GB0920612.9; Date of Search: Jan. 28, 2010.
Examination Report Under Section 18(3) From British Patent Application No. GB0613068.6; Date of Search: Jan. 31, 2011.
Examination Report Under Section 18(3) From British Patent Application No. GB0715089.9; Date of Search: Sep. 30, 2010.
Examination Report Under Section 18(3) from British Patent Application No. GB0715089.9 dated Apr. 11, 2011.
GB Examination Report; British Patent Application No. GB0613068.6; dated Nov. 26, 2010.
Office Action Dated Mar. 21, 2011 from U.S. Appl. No. 11/172,524.
Search Report Under Section 17, Application No. GB0715089.9; Date of Search: Nov. 27, 2007.
Search Report Under Section 17; British Patent Application No. GB0715089.9; Date of Search: May 9, 2008.
Search Report Under Section 17 From British Patent Application No. GB0601795.8; Date of Search: Apr. 22, 2009.
U.S. Office Action Dated Mar. 21, 2011 from U.S. Appl. No. 11/172,525.
U.S. Appl. No. 11/172,524; Office Action Dated Apr. 9, 2009.
Extended European Search Report Dated Oct. 20, 2014 from European Patent Application No. 14170174.8-1870.
3GPP: "3rd Generation Partnership Project; Technical Specification Group Core Network and Terminals; Non-Access-Stratum (NAS) protocol for Evolved Packet System (EPS); Sage 3 (Release 8)," Mar. 31, 2009 pp. 1-250, XP055148123, Retrieved from the Internet: URL:www.3gpp.org/specifications retrieved on Oct. 21, 2014—*p. 58, Paragraph [5.5.1.2.2] and p. 82 paragraph [5.5.3.2.2]; paragraph [5.5.1.2.2]*.

* cited by examiner

NETWORK ELEMENTS, WIRELESS COMMUNICATION SYSTEM AND METHODS THEREFOR

RELATED APPLICATION

This application claims the benefit of Great Britain Patent Application No. 1313701.3 filed Jul. 31, 2013. The content of this application is fully incorporated herein in its entirety.

FIELD OF THE INVENTION

The field of this invention relates to network elements, a wireless communication system and methods for determining a subscriber identity of a wireless communication unit

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org). The $3^{rd}$ generation of wireless communications has generally been developed to support macro-cell mobile phone communications. Such macro cells utilise high power base stations (NodeBs in 3GPP parlance) to communicate with wireless communication units within a relatively large geographical coverage area. Typically, wireless communication units, or User Equipment (UEs) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in a form of a Radio Network Controller (RNC), operably coupled to the one or more Node Bs, via a so-called Iub interface. The second generation wireless communication system (2G), also known as GSM, is a well-established cellular, wireless communications technology whereby "base transceiver stations" (equivalent to the Node B's of the 3G system) and "mobile stations" (user equipment) can transmit and receive voice and packet data. Several base transceiver stations are controlled by a Base Station Controller (BSC), equivalent to the RNC of 3G systems.

Communications systems and networks are developing towards a broadband and mobile system. The 3rd Generation Partnership Project has proposed a Long Term Evolution (LTE) solution, namely, an Evolved Universal Mobile Telecommunication System Territorial Radio Access Network, (E-UTRAN), for a mobile access network, and a System Architecture Evolution (SAE) solution, namely, an Evolved Packet Core (EPC), for a mobile core network. An all IP EPC and an E-UTRAN together are often referred to as an Evolved Packet System (EPS). An EPS provides only packet switching (PS) domain data access so voice services are provided by a 2G or 3G Radio Access Network (RAN) and circuit switched (CS) domain network or Voice over IP (VoIP) techniques. User Equipment(UE) can access a CS domain core network through a 2G/3GRAN such as the (Enhanced Data Rate for GSM Evolution, EDGE) Radio Access Network (GERAN) or a Universal Mobile Telecommunication System Terrestrial Radio Access Network (UTRAN), and access the EPC through the E-UTRAN.

Some User Equipments have the capability to communicate with networks of differing radio access technologies. For example, a user equipment may be capable of operating within a UTRAN and within an E-UTRAN.

Lower power (and therefore smaller coverage area) cells are a recent development within the field of wireless cellular communication systems. Such small cells are effectively communication coverage areas supported by low power base stations. The terms "picocell" and "femtocell" are often used to mean a cell with a small coverage area, with the term femtocell being more commonly used with reference to residential small cells.

Small cells are often deployed with minimum RF (radio frequency) planning and those operating in consumers' homes are often installed in an ad hoc fashion. The low power base stations which support small cells are referred to as Access Points (AP's) with the term Home Node B (HNB's) or Evolved Home Node B (HeNB) identifying femtocell Access Points. Each small-cell is supported by a single Access Point. These small cells are intended to augment the wide area macro network and support communications to multiple User Equipment devices in a restricted, for example, indoor environment. An additional benefit of small cells is that they can offload traffic from the macro network, thereby freeing up valuable macro network resources An HNB is an Access Point that provides a wireless interface for user equipment connectivity. It provides a radio access network connectivity to a user equipment (UE) using the so-called Iuh interface to a network Access Controller, also known as a Home Node B Gateway (HNB-GW). One Access Controller (AC) can provide network connectivity of several HNB's to a core network.

Typical applications for such Access Points include, by way of example, residential and commercial locations, communication 'hotspots', etc., whereby Access Points can be connected to a core network via, for example, the Internet using a broadband connection or the like. In this manner, small cells can be provided in a simple, scalable deployment in specific in-building locations where, for example, network congestion or poor coverage at the macro-cell level may be problematic.

Thus, an AP is a scalable, multi-channel, two-way communication device that may be provided within, say, residential and commercial (e.g. office) locations, 'hotspots' etc, to extend or improve upon network coverage within those locations. Although there are no standard criteria for the functional components of an AP, an example of a typical AP for use within a 3GPP 3G system may comprise Node-B functionality and some aspects of Radio Network Controller (RNC) functionality as specified in 3GPP TS 25.467. These small cells are intended to be able to be deployed alongside the more widely used macro-cellular network and support communications to UEs in a restricted, for example 'in-building', environment.

Herein, the term "small cell" means any cell having a small coverage area and includes "picocells" and "femtocells."

It is often useful in cellular networks (including small cell networks) to obtain the permanent subscriber identity (IMSI) of the UEs which are accessing the small cells. This identity can be used for various purposes, one being to track UEs as they move through the macrocell or small cell network. In a 3G system, a common technique in small cells is for a Home Node B, (an Access Stratum device), to request the UE's permanent subscriber identity (IMSI) using an NAS (Non-Access Stratum) Identity Request message, normally used by the Core Network. The IMSI which results can be used for access control within a cell or for logging particular performance behaviours of that UE. In LTE on the other hand, the protocol design authenticates and optionally encrypts the Non-Access Stratum (NAS) between the UE and the MME (Mobility Management Entity) using separate keys from those used for authentication and typically encryption in the Access Stratum or the RRC (Radio Resource Control) layer, which is authenticated and typically encrypted between the UE and the eNode B and these NAS keys are not known to the Access Stratum devices such as the eNode B. Thus, the NAS security deployed in LTE means that an eNode B (or a Home eNode B) cannot use the same technique as is used in 3G, specifically cannot send a valid NAS Identity Request message to the UE, as it cannot generate the valid integrity protection code used for authentication of the message by the UE. Such a request would have to be issued by the MME and even if the MME were to issue such request, the UE response would not be readable by the eNode B if NAS encryption were enabled. There is no standard method for the eNode B to request that the MME generates such request and the MME will only rarely generate such a request under normal operation.

SUMMARY OF THE INVENTION

Accordingly, the invention seeks to mitigate, alleviate or eliminate the above-mentioned disadvantage.

Aspects of the invention provide network elements, a wireless communication system and methods therefor as described in the appended claims.

According to a first aspect of invention there is provided a method for determining a permanent subscriber identity of a wireless communication unit located within a cell of a wireless communication system comprising a radio access network and a core network, the method including, at a network element serving said cell in the radio access network, receiving a request for services from a wireless communication unit wherein the request for services includes a temporary identity of the wireless communication unit, in response to receiving said request for services, at the network element, generating and transmitting to the wireless communication unit a response message wherein the response message prompts the wireless communication unit to make a second request for services including its permanent subscriber identity, and at said network element, receiving said second request for services including the permanent identity of the wireless communication unit.

The method may also include storing the IMSI which is received from the wireless communication unit and included in its subsequent request for services. The received IMSI may be used for access control purposes, for example and in one embodiment, the method may include determining if the wireless communication unit having a particular IMSI is permitted to receive services through the network element.

As a result of the second request for services being presented to the core network, the core network may re-authenticate the wireless communication unit and may allocate a new temporary identity to it. This new temporary identity, which may be an S-TMSI, for example, would then be used by the wireless communication unit in subsequent interactions with the core network, (an EPC, for example). The network element (which may comprise an eNode B or HeNode B) may also read and store this new allocated temporary subscriber identity, eg. S-TMSI, (provided that the NAS signalling is only authenticated and not encrypted), and if a later connection request is received by the network element using this new temporary subscriber identity, then the network element need not generate and send the response message as it can associate the request with the permanent subscriber identity which it has already discovered. Furthermore, if the network element receives a temporary subscriber identity in a subsequent request for services which matches a temporary subscriber identity already stored, it can be used by the network element for any purpose for which the IMSI is normally used; access control, for example.

In one embodiment, the response message includes a cause code. The cause code may be chosen such that it indicates to the wireless communication unit that the temporary subscriber identity of the wireless communication unit could not be recognised by the core network.

For example, The response message may comprise a non-authenticated EMM (Evolved Packet System Mobility Management) Service Reject with Cause: "UE identity cannot be derived by the network" in response to a Service Request following an RRC Connection Request from the wireless communication unit and carrying an S-TMSI. This results in the wireless communication unit repeating the RRC (Radio Resource Control) Connection Request and Service Request with the IMSI as its identifier. In LTE, the Service Reject message is normally sent unauthenticated by the EPC for this cause, as the cause is essentially informing the wireless communication unit that the Evolved Packet Core does not know the wireless communication unit's temporary identifier (S-TMSI), and so cannot provide authentication of messages to that wireless communication unit as it has no stored credentials for that particular wireless communication unit.

Advantageously, the method does not require access to the private interfaces within an EPC. Also the method can be used with standard User Equipment without requiring the UE to be modified in any way. The invention has the further advantage of providing a means for determining the IMSI of a User Equipment in a LTE cell without breaching the LTE inherent security design or behaviour.

According to a second aspect of invention there is provided a radio access network element for determining a permanent subscriber identity (IMSI) of a wireless communication unit located in a cell of wireless communication system comprising a radio access network and a core network, the radio access network element being arranged to serve said cell and including; a receiver arranged to receive a request for services from a wireless communication unit wherein the request for services includes a temporary identity of the wireless communication unit, a signal processor arranged, in response to receipt of said request for services by the receiver, to generate a response message wherein the response message prompts the the wireless communication unit to make a second request for services including its permanent subscriber identity, and a transmitter arranged to transmit said generated response message to the wireless communication unit and wherein the receiver is further arranged to receive the second request for services including the permanent subscriber identity from the wireless communication unit.

The radio access network element may also include a memory for storing the permanent subscriber identity received from the wireless communication unit with the second request for services. The permanent subscriber identity may comprise an IMSI and may be useful to the radio access network or to the core network for the purpose of tracking the movements of the wireless communication unit within the wireless communication system The signal processor may be further arranged to include a cause code in the generated response message.

The radio access network element may be arranged to send to the core network a request for services in respect of the wireless communication unit including the permanent subscriber identity received from the wireless communication unit and to receive from the core network a new temporary subscriber identity allocated to the wireless communication unit. The radio access network element may include a memory for storing the new temporary subscriber identity which may be allocated by the EPC to the wireless communication unit. The stored new temporary identity may comprise an S-TMSI. Storing the new temporary identity has the advantage that subsequent RRC Connection requests containing the same (stored) temporary identity are then admitted as normal to prevent a reject message being generated and an attach process then needing to be carried out for every data transfer between the wireless communication unit and the core network. This is possible if the NAS messages are unciphered between the wireless communication unit and the EPC.

The radio access network may then be further arranged to determine if a temporary subscriber identity received with a request for services from a wireless communication unit is the same as a stored new temporary subscriber identity, and if so, to generate and transmit a request for services in respect of the wireless communication unit to the core network without generating the response message.

The signal processor and/or memory of the radio access network element may be implemented in one or more integrated circuits.

The network element may be included in an extended Node B (eNode B) or within an extended Home Node B (HeNB) or within any other radio access network element.

According to a third aspect of the invention there is provided a wireless communication system including a radio access network in accordance with the invention.

According to a fourth aspect of the invention, there is provided a non-transitory computer readable medium having computer readable code stored thereon for execution by a processor to perform a methods in accordance with the invention.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

These and other aspects, features and advantages of the invention will be apparent from, and elucidated with reference to, the embodiments described hereinafter.xx

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Those skilled in the art will recognize and appreciate that the specifics of the specific examples described are merely illustrative of some embodiments and that the teachings set forth herein are applicable in a variety of alternative settings. For example, since the inventive concepts do not depend on any particular radio access technology or combination thereof, it is envisaged that the inventive concepts may be applied to other RAT's although LTE systems systems are shown in the embodiments. As such, other alternative implementations within cellular communication systems conforming to different standards are contemplated and are within the scope of the various teachings described. Furthermore, the inventive concepts may be applied to small cells or to macrocells or to systems comprising a combination of both.

Figure 1:
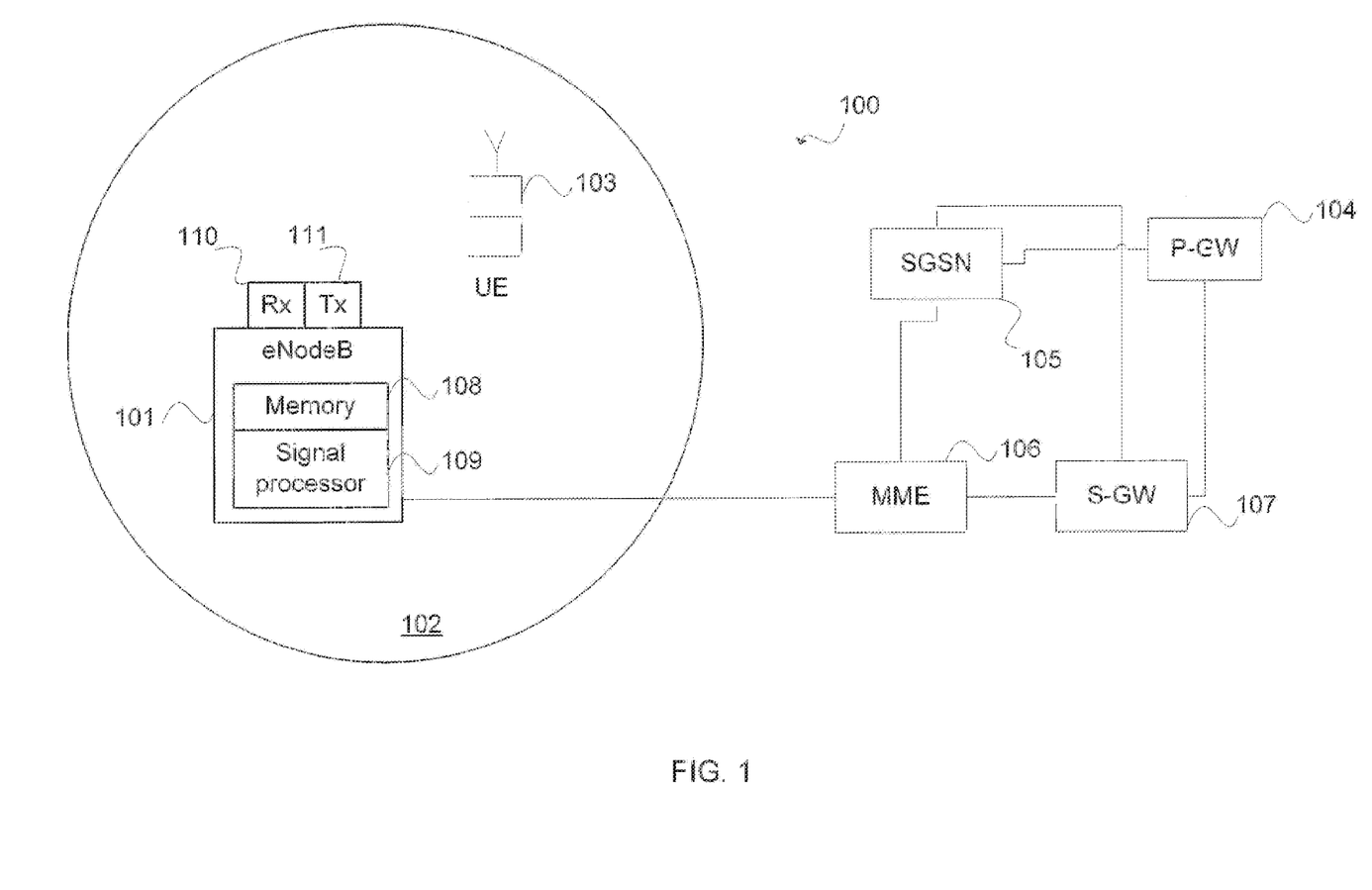
FIG. 1 illustrates a part of a cellular communication system including a network element operating in accordance with an example embodiment of the invention for determining a permanent subscriber identity.

Referring now to FIG. 1, an example of part of a wireless communication system operating in accordance with embodiments of the invention is illustrated and indicated generally at 100 and comprises an evolved Node B (eNode B) 101 supporting an LTE cell 102. In other embodiments, the eNode B 101 may support a multiplicity of cells. The evolved Node B 101 comprises a part of a radio access network which in this example is an E-UTRAN. User Equipment 103 is located within the area of coverage of the cell 102. An evolved packet core (EPC) of the Wireless Communications System of FIG. 1 includes a Packet Gateway P-GW 104 and a Serving GPRS (General Packet Radio System) Support Node (SGSN) 105. The P-GW 104 is responsible for interfacing the radio access network with a packet data network, eg. a Packet Switched Data Network (PSDN) (such as the Internet). The SSGN 105 performs a routing and tunnelling function for traffic to and from the cell 102, while the P-GW 104 links with external packet networks. The EPC also comprises a Mobility Management Entity 106. The evolved Home Node B 101 is linked to the SSGN 105 through a Mobility Management Entity (MME) 106. The evolved Home Node B 101 is also connected with the P-GW 104 through the MME 106 and a Service Gateway S-GW 107. The MME 106 handles signalling control and mobility while the S-GW 107 is a local anchor point for user data. The evolved Node B 101 is provided with a memory 108 and a signal processing module 109 whose function will be described below. The eNode B also comprises a receiver 110 and a transmitter 111.

Operation of the embodiment of FIG. 1 will now be described with reference to FIG. 1 and to the flowchart of FIG. 2. As mentioned above, the evolved Node B 101 supporting the LTE cell 102 cannot learn the IMSI (International Mobile Subscriber Identity) of the User Equipment 103 by sending it an Identity Request (as would be the case for a 3G cell).

As is usual in LTE, when a UE performs an initial Attach Procedure with an MME, the UE sends its permanent subscriber identity (IMSI). The MME identifies the UE and validates the service that needs to be provided using the IMSI. Once the MME has done this initial validation, it assigns a temporary identity known as the Global Unique Temporary Identity (GUTI) to the UE. From that point onwards, the UE sends the GUTI (or an identifier derived from this) and not the IMSI to the MME for subsequent service requests, including "Attaches." LTE employs this mechanism primarily as a security and confidentiality feature to prevent the IMSI value from being captured from the messages. Typically, the GUTI consists of two components: a Globally Unique MME Identity (GUMMEI), which is the identity of the MME that has allocated the GUTI, and the M-TMSI, which is the identity of the UE within that MME. A further temporary identity, The SAE (System Architecture Evolution) TMSI or "S-TMSI" is constructed from the MMEC (MME Code) and the M-TMSI and used to identify the UE over the radio path and is included in an RRC connection request and in paging messages.

Typically, a UE wishing to receive services form a core network such as an EPC for example sends a RRC (Radio Resource Control) Connection Request message, which includes its S-TMSI to the evolved Node B (or Home evolved Node B in the small cell case). In response, the evolved Node B forwards the request for services to the MME as an S 1 Initial UE Message (Service Request) which also includes the S-TMSI. If the EPC does not recognise the S-TMSI then the MME sends a Service Reject message back to the UE via the evolved Node B. The Service Reject message which is received by the UE is accompanied by a particular Cause Code specifying that the identity of the UE could not be verified. This Service Reject message is a non-authenticated NAS message. In response to receiving this message and accompanying cause code, a typical UE will retry the connection process, this time using its IMSI as its identifier.

As mentioned above the evolved Node B, cannot request the IMSI. One embodiment of the invention overcomes this problem by generating, in the evolved Node B a "fake" Service Reject message for any request for services (e.g. RACH (Random Access Channel) from a UE which includes the S-TMSI and then transmitting this message to the UE.

Figure 2:
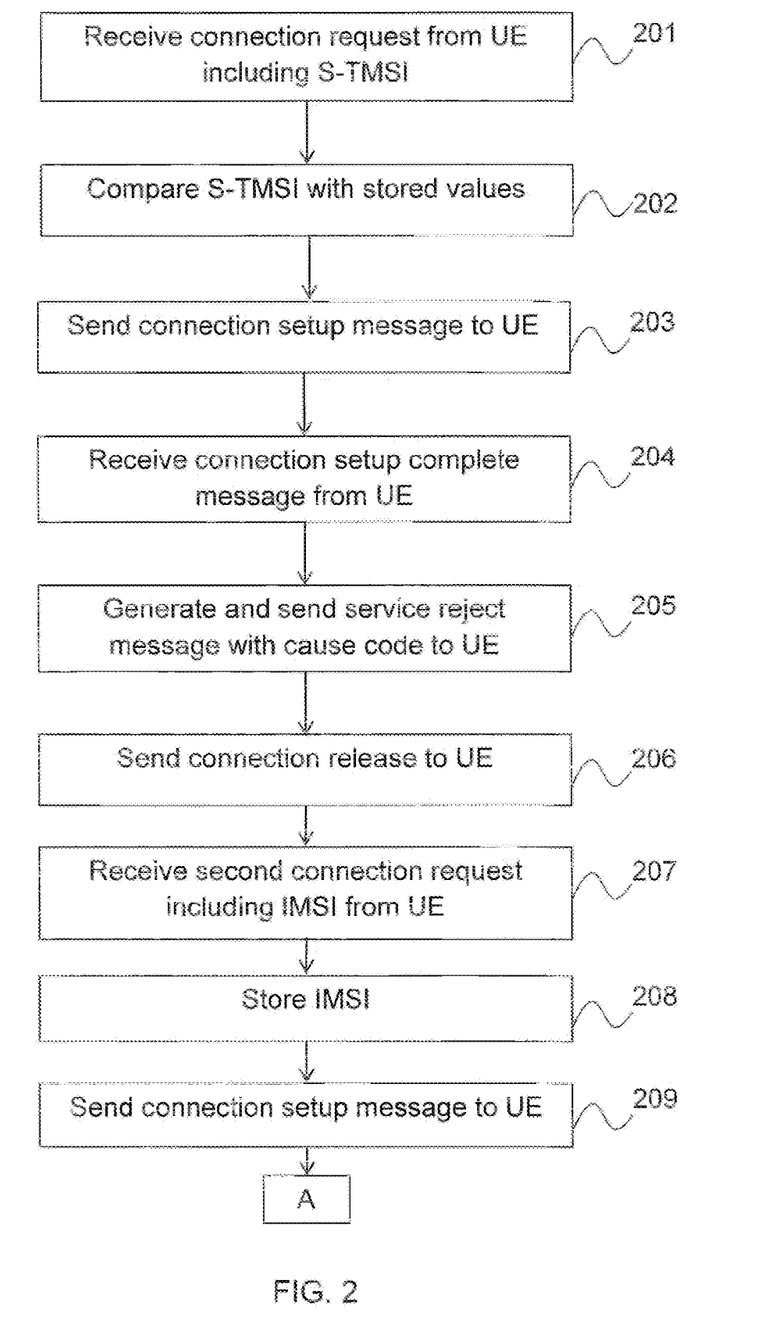
FIGS. 2 and 2a illustrate a message flowchart of an example of a method for determining a permanent subscriber identity.

With reference to FIG. 2 the UE 103 which has already been allocated an S-TMSI due to one or more previous interactions with the EPC, attempts to attach to the core network 104-107 by sending a request for services in the form of an RRC Connection Request message to the eNode B 101. This message includes the S-TMSI of the UE 103. At 201, the receiver 110 of the eNode B 101 receives this connection request and the S-TMSI.

At 202, the received S-TMSI may be compared with S-TMSIs previously stored.

At 203, in response to the request for services from the UE 103, the eNode B 101 sends an RRC Connection Setup message to the UE103 via its transmitter 111.

In response, the UE 103 sends an RRC Connection Setup Complete (Service Request) message which is received at 204 by the receiver 110 of the eNode B 101. This message may also include the S-TMSI.

At 205, in cases where no match was found at step 202 between the received S-TMSI and a stored S-TMSI, the signal processor 109 in the eNode B 101 generates an RRC Downlink Information Transfer containing a NAS Service Reject message with Cause Code specifying that the UE identity could not be derived by the network. This reject message is transmitted to the UE 103 via the eNodeB's transmitter 111.

The reject message is followed by a connection release message transmitted from the eNode B to the UE at 206.

The reject message with its cause code prompts the UE 103 to try again, a second time, with a request for services and including its permanent identity (IMSI) with this second request.

Hence at 207, the receiver 110 of the eNode B 101 receives from the UE 103, an RRC Connection Request including the IMSI.

The received IMSI may be stored in the memory 108 at 208.

At 209, the eNode B 101 may then proceed to connect the UE 103 with the core network 104-107 by sending it an RRC Connection Setup message.

At 210, the eNode B 101 receives from the UE 103 an RRC Connection Setup Complete (attach request) message.

At 211, the eNode B 101 sends to the MME 106 an UE attach request in the form of an S1 initial UE message.

The method may then continue at 212 with the usual exchange of messaging for authentication and confirming the capabilities of the UE.

Figure 2A:
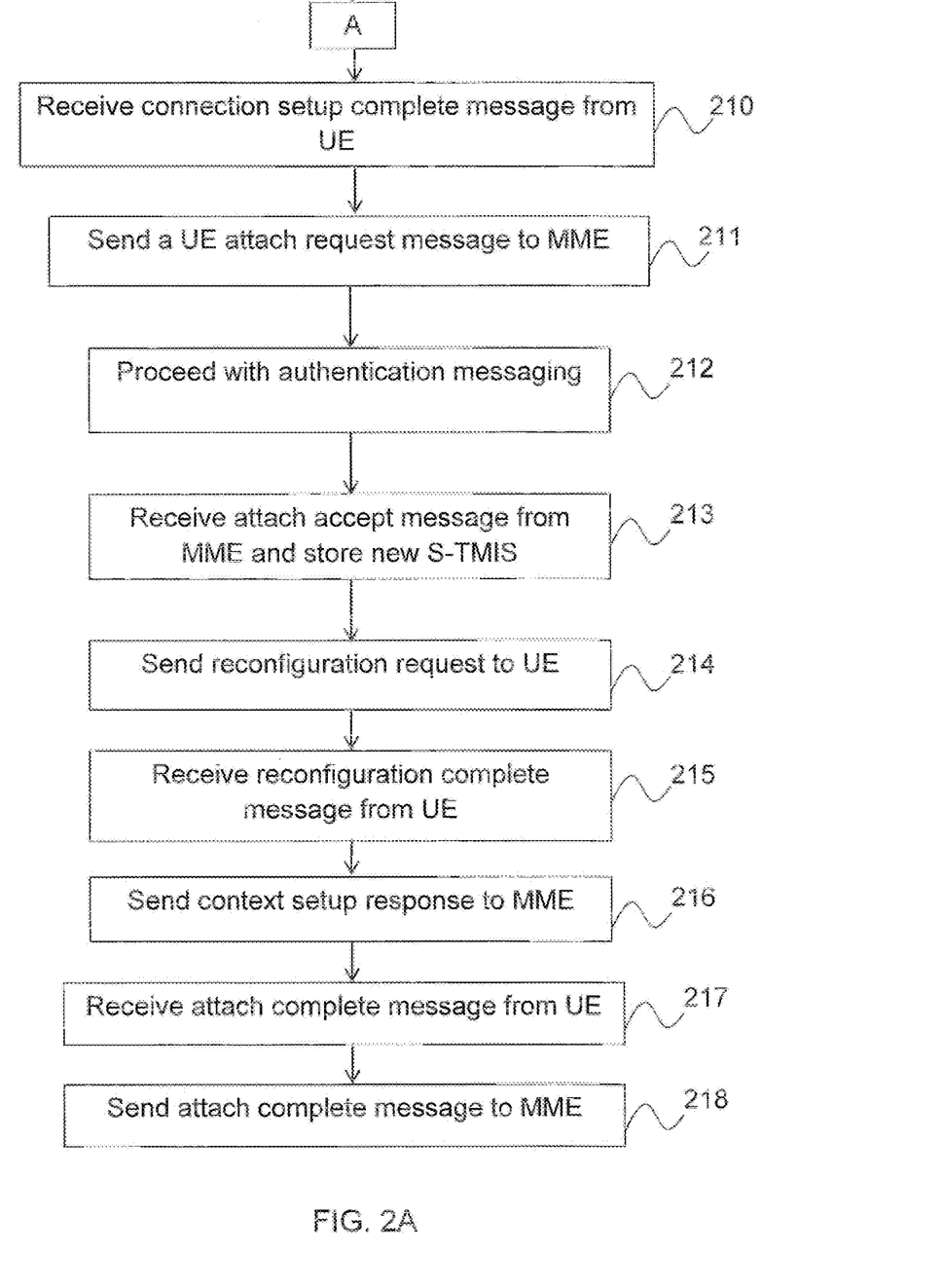

At 213, the eNode B 101 receives an S1 Initial Context Setup Request (Attach Accept),which includes a new S-TMSI allocated to the UE, from the MME 106 and in response, at 214, the eNode B 101 transmits to the UE an RRC Reconfiguration Request.(Attach Accept (S-TMSI)). The new S-TMSI which is allocated to the UE may be stored in the memory 108 in the eNode B.

In response, the UE 103 sends an RRC Reconfiguration Complete message which is received by the eNode B 101 at 215.

At 216, the eNode B 101 sends to the NME 106 an S1 Initial Context Setup Response message.

At 217, the eNode B 101 receives from the UE 103 an S1 Downlink Information Transfer (Attach Complete) message.

At 218, the eNode B 101 sends to the NME 106 an S1 Uplink NAS Transport (Attach Complete) message.

Subsequently, the UE 103 can receive services from the core network 104-107 via the eNode B 101 which provides the radio link.

The signal processing functionality of the embodiments of the invention, particularly the signal processing module 109 may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface , such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' non-transitory computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

I claim:

1. A method for determining a permanent subscriber identity of a wireless communication unit located within a cell of a wireless communication system comprising a radio access network and a core network, the method including, at a network element:

serving said cell in the radio access network, receiving a request for services from a wireless communication unit wherein the request for services includes a temporary identity that comprises a System Architecture Evolution, SAE, Temporary Mobile Subscriber Identity, S-TMSI, of the wireless communication unit, in response thereto generating and transmitting to the wireless communication unit a response message that comprises a non-authenticated Evolved Packet System Mobility Management, EMM Service Reject with Cause: 'User Equipment, UE, identity cannot be derived by the network' wherein the response message prompts the wireless communication unit to make a second request for services including its permanent subscriber identity, and receiving said second request for services including the permanent identity of the wireless communication unit.

2. The method of claim 1 including storing the permanent subscriber identity received from the wireless communication unit with the second request for services.

3. The method of claim 1 wherein the response message includes a cause code.

4. The method of claim 3 wherein the cause code is be chosen such that it indicates to the wireless communication unit that the temporary identity of the wireless communication unit could not be recognized by the core network.

5. The method of claim 1 comprising, at the network element, sending to the core network a request for services in respect of the wireless communication unit including the permanent subscriber identity received from the wireless communication unit, receiving from the core network a new temporary subscriber identity allocated to the wireless communication unit and storing said new temporary subscriber identity.

6. The method of claim 5 including, at the network element, determining if a temporary subscriber identity received with a request for services from a wireless communication unit is the same as a stored new temporary subscriber identity, and if so, sending a request for services in respect of the wireless communication unit to the core network without generating and transmitting to the wireless communication unit the response message.

7. A radio access network element for determining a permanent subscriber identity of a wireless communication unit located in a cell of wireless communication system comprising a radio access network and a core network, the radio access network element being arranged to serve said cell and comprising:
 a receiver arranged to receive a request for services from a wireless communication unit wherein the request for services includes a temporary identity that comprises a System Architecture Evolution, SAE, Temporary Mobile Subscriber Identity, S-TMSI, of the wireless communication unit,
 a signal processor arranged, in response thereto, to generate a response message that comprises a non-authenticated Evolved Packet System Mobility Management, EMM, Service Reject with Cause: 'User Equipment, UE, identity cannot be derived by the network' wherein the response message prompts the wireless communication unit to make a second request for services including its permanent subscriber identity, and
 a transmitter arranged to transmit said generated response message to the wireless communication unit and wherein the receiver is further arranged to receive the second request for services including the permanent subscriber identity of the wireless communication unit.

8. The radio access network element of claim 7 comprising a memory for storing the permanent subscriber identity received from the wireless communication unit with the second request for services.

9. The radio access network element of claim 7 wherein the signal processor is arranged to include a cause code in the generated response message.

10. The radio access network element of claim 7 arranged to send to the core network a request for services in respect of the wireless communication unit including the permanent subscriber identity received from the wireless communication unit and to receive from the core network a new temporary subscriber identity allocated to the wireless communication unit, and wherein the radio access network element includes a memory for storing said new temporary subscriber identity.

11. The radio access network element of claim 10 arranged to determine if a temporary subscriber identity received with a request for services from a wireless communication unit is the same as a stored new temporary subscriber identity, and if so, to generate and transmit a request for services in respect of the wireless communication unit to the core network without generating the response message.

12. The radio access network element of claim 7 wherein the signal processor is implemented in an integrated circuit.

13. A non-transitory tangible computer program product comprising executable code stored therein for execution by a processor to perform a method for determining a permanent subscriber identity of a wireless communication unit located within a cell of a wireless communication system comprising a radio access network and a core network, wherein the code is operable for, when executed at a radio access network element:
 serving said cell in the radio access network,
 receiving a request for services from a wireless communication unit wherein the request for services includes a temporary identity that comprises a System Architecture Evolution, SAE, Temporary Mobile Subscriber Identity, S-TMSI, of the wireless communication unit,
 in response thereto generating and transmitting to the wireless communication unit a response message that comprises a non-authenticated Evolved Packet System Mobility Management, EMM, Service Reject with Cause: 'User Equipment, UE, identity cannot be derived by the network' wherein the response message prompts the wireless communication unit to make a second request for services including its permanent subscriber identity, and
 receiving said second request for services including the permanent identity of the wireless communication unit.

14. The non-transitory tangible computer program product of claim 13 comprising at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

* * * * *